(12) United States Patent
Herbolzheimer et al.

(10) Patent No.: US 12,304,282 B2
(45) Date of Patent: May 20, 2025

(54) THERMAL SYSTEM FOR A MOTOR VEHICLE WITH ELECTRIC DRIVE CAPABILITY, MOTOR VEHICLE, AND METHOD FOR OPERATING THE THERMAL SYSTEM

(71) Applicant: Bayerische Motoren Werke Aktiengesellschaft, Munich (DE)

(72) Inventors: Robert Herbolzheimer, Groebenzell (DE); Oliver Horn, Munich (DE); Markus Moser, Oberschleissheim (DE); Patrick Oswald, Munich (DE); Ulrich Wirth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 261 days.

(21) Appl. No.: 17/764,374

(22) PCT Filed: Oct. 7, 2020

(86) PCT No.: PCT/EP2020/078115
§ 371 (c)(1),
(2) Date: Mar. 28, 2022

(87) PCT Pub. No.: WO2021/089268
PCT Pub. Date: May 14, 2021

(65) Prior Publication Data
US 2022/0339989 A1 Oct. 27, 2022

(30) Foreign Application Priority Data

Nov. 5, 2019 (DE) ...................... 10 2019 129 784.2

(51) Int. Cl.
*B60H 1/14* (2006.01)
*B60H 1/00* (2006.01)
(Continued)

(52) U.S. Cl.
CPC ......... *B60H 1/143* (2013.01); *B60H 1/00278* (2013.01); *H01M 10/613* (2015.04);
(Continued)

(58) Field of Classification Search
CPC .................. B60H 1/43; B60H 1/00278; B60H 2001/00307; H01M 10/613;
(Continued)

(56) References Cited

U.S. PATENT DOCUMENTS

2012/0247716 A1   10/2012 Galtz et al.
2016/0200171 A1    7/2016 Nagasaka et al.
(Continued)

FOREIGN PATENT DOCUMENTS

CN    102686423 A    9/2012
CN    106536259 A    3/2017
(Continued)

OTHER PUBLICATIONS

Chinese-languge Office Action issued in Chinese Application No. 202080062069.0 dated Sep. 14, 2023, with English translation (16 pages).

(Continued)

*Primary Examiner* — Elizabeth J Martin
(74) *Attorney, Agent, or Firm* — Crowell & Moring LLP

(57) ABSTRACT

A thermal system for a motor vehicle has a coolant-conducting HVS circuit connected to a traction battery, a heating circuit controlling the temperature of a passenger compartment thermally coupled to the HVS circuit, a cooling circuit connected to a heat source and fluidically coupled to the HVS circuit to transfer to the traction battery heat provided by the heat source and transported by the coolant, and a control device configured to, during the heating of the traction battery, branch off at least a proportion of the heat before the transfer to the traction battery and transmit said (Continued)

proportion of the heat into the heating circuit to precondition the heating circuit.

8 Claims, 1 Drawing Sheet

(51) Int. Cl.
  *H01M 10/613* (2014.01)
  *H01M 10/615* (2014.01)
  *H01M 10/625* (2014.01)
  *H01M 10/63* (2014.01)
  *H01M 10/6568* (2014.01)
  *H01M 10/663* (2014.01)

(52) U.S. Cl.
  CPC ....... *H01M 10/615* (2015.04); *H01M 10/625* (2015.04); *H01M 10/63* (2015.04); *H01M 10/6568* (2015.04); *H01M 10/663* (2015.04); *B60H 2001/00307* (2013.01); *H01M 2220/20* (2013.01)

(58) Field of Classification Search
  CPC .. H01M 10/615; H01M 10/625; H01M 10/63; H01M 10/6568; H01M 10/663; H01M 2220/20
  See application file for complete search history.

(56) References Cited

U.S. PATENT DOCUMENTS

| | | | |
|---|---|---|---|
| 2016/0248129 A1* | 8/2016 | Dunham | H01M 10/625 |
| 2017/0174039 A1 | 6/2017 | Schedel et al. | |
| 2018/0208061 A1* | 7/2018 | Ben Ahmed | B60H 1/00899 |
| 2018/0236842 A1 | 8/2018 | Allgaeuer et al. | |
| 2019/0070951 A1* | 3/2019 | Lucke | H01M 10/625 |
| 2020/0164719 A1 | 5/2020 | Shiratori et al. | |

FOREIGN PATENT DOCUMENTS

| | | |
|---|---|---|
| CN | 107848368 A | 3/2018 |
| CN | 108382164 A | 8/2018 |
| CN | 110103665 A | 8/2019 |
| DE | 196 49 710 A1 | 6/1998 |
| DE | 10 2009 059 240 A1 | 6/2011 |
| DE | 10 2011 016 070 A1 | 10/2012 |
| DE | 10 2014 217 959 A1 | 3/2016 |
| DE | 10 2017 201 206 A1 | 7/2018 |
| DE | 10 2017 223 114 A1 | 6/2019 |
| WO | WO 2019/026528 A1 | 2/2019 |
| WO | WO 2019/158316 A1 | 8/2019 |

OTHER PUBLICATIONS

Chinese-language Office Action issued in Chinese Application No. 202080062069.0 dated May 26, 2023 with English translation (15 pages).

International Search Report (PCT/ISA/210) issued in PCT Application No. PCT/EP2020/078115 dated Jan. 11, 2021 with English translation (five (5) pages).

German-language Written Opinion (PCT/ISA/237) issued in PCT Application No. PCT/EP2020/078115 dated Jan. 11, 2021 (six (6) pages).

German-language Search Report issued in German Application No. 10 2019 129 784.2 dated Jun. 10, 2020 with partial English translation (11 pages).

* cited by examiner

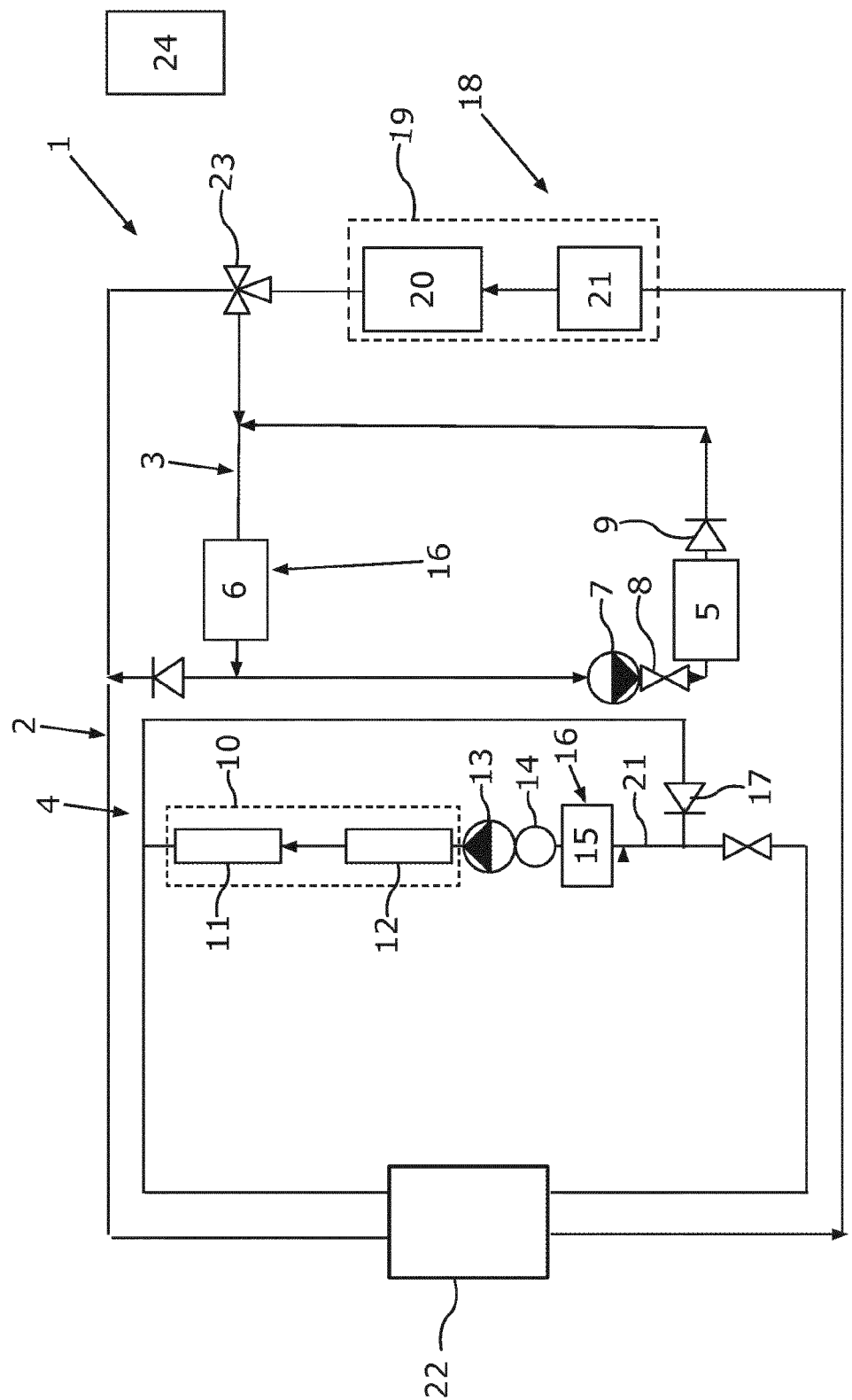

THERMAL SYSTEM FOR A MOTOR VEHICLE WITH ELECTRIC DRIVE CAPABILITY, MOTOR VEHICLE, AND METHOD FOR OPERATING THE THERMAL SYSTEM

BACKGROUND AND SUMMARY

The invention relates to a heat system for an electrically driveable motor vehicle. The heat system has a coolant-carrying HVA circuit to which a traction accumulator for providing a supply to an electric drive unit of the motor vehicle is connected. The heat system moreover has a coolant-carrying heating circuit which serves for controlling the temperature of a passenger cell of the motor vehicle and which is coupled thermally, for example by way of a refrigeration circuit of the heat system, to the HVA circuit. The heat system furthermore comprises a coolant-carrying cooling circuit to which a heat source is connected and which is coupled fluidically to the HVA circuit for transmitting to the traction accumulator, for the purpose of heating the traction accumulator, heat provided by the heat source and transported via the coolant. The invention also relates to an electrically driveable motor vehicle having a heat system, and to a method for operating a heat system.

The focus of interest here is on heat systems for electrically driveable motor vehicles, that is to say hybrid vehicles or electric vehicles. Electrically driveable motor vehicles have an electric drive unit with at least one electric traction machine or drive machine that is supplied with energy from an electric traction accumulator, for example a high-voltage energy accumulator. The heat system serves in this case for carrying out various temperature-control tasks in the motor vehicle, that is to say for supply or discharge of heat of various vehicle components. For optimum operation of the motor vehicle, the temperature control of the traction accumulator is of particular importance. For the purpose of temperature control, that is to say for the purpose of heating and cooling, of the traction accumulator, the traction accumulator is generally incorporated into an HVA circuit of the heat system of the motor vehicle. In the case of low outside temperatures, the traction accumulator can be heated for example before the start of a journey. In the case of low outside temperatures, however, an interior compartment or a passenger cell of the motor vehicle is also to be heated. However, owing to the required heating of the coolant in a heating circuit of the motor vehicle that is configured for controlling the temperature of the interior compartment, this can take a certain length of time, which can be uncomfortable for vehicle occupants.

It is an object of the present invention to provide a heat system for an electrically driveable motor vehicle that is improved in relation to the prior art.

Said object is achieved according to the invention by a heat system, an electrically driveable motor vehicle and a method for operating a heat system having the features according to the respective independent patent claims. Advantageous embodiments of the invention form the subject matter of the dependent patent claims, the description and the FIGURE.

A heat system according to the invention for an electrically driveable motor vehicle has a coolant-carrying HVA circuit to which a traction accumulator for providing a supply to an electric drive unit of the motor vehicle is connected, and also has a coolant-carrying heating circuit which serves for controlling the temperature of a passenger cell of the motor vehicle. The heating circuit is coupled thermally to the HVA circuit. The heat system moreover has a coolant-carrying cooling circuit to which a heat source is connected and which is coupled fluidically to the HVA circuit for transmitting to the traction accumulator, for the purpose of heating the traction accumulator, heat provided by the heat source and transported via the coolant. A control device of the heat system is configured such that, during the heating of the traction accumulator by means of the heat of the heat source, it branches off at least a part of the heat of the heat source before transmission to the traction accumulator and, for the purpose of preconditioning the heating circuit by way of preheating of the coolant in the heating circuit, transfers said part into the heating circuit.

The invention moreover relates to a method for operating a heat system according to the invention. In the method, it is firstly ascertained whether a heating requirement for the traction accumulator is present. If a heating requirement for the traction accumulator is present, then, during the heating of the traction accumulator, only a part of the heat of the heat source is transmitted to the traction accumulator, while, for the purpose of preconditioning the heating circuit, another part of the heat is transferred to the heating circuit before the heat provided by the heat source reaches the traction accumulator.

The heat system is configured for use in an electrically driveable motor vehicle. The heat system can in this case be operated in different operation modes, that is to say different heating modes and different cooling modes. The different operation modes may be provided by the control device of the heat system. The control device may also be integrated into a control unit of the motor vehicle. The focus of interest here is on an operation mode in the form of a heating mode for the traction accumulator or the traction battery. The heating mode is provided in the case of a heating requirement for the traction accumulator, which heating requirement is determined for example on the basis of a temperature of the traction accumulator and/or an ambient temperature in an environment of the motor vehicle.

The heat system has the HVA circuit, the heating circuit and the cooling circuit. The HVA circuit and the heating circuit are components of an overall cooling circuit of the heat system. The overall cooling circuit is configured for circulation of a coolant and, for this purpose, has in particular corresponding lines, pumps, etc. The coolant is preferably a water/glycol mixture. The heat system may additionally have a refrigeration circuit which is configured for circulation of a refrigerant and is separated or decoupled fluidically from the overall cooling circuit, but is coupled thermally to the overall cooling circuit. The refrigeration circuit serves for cooling and heating the interior compartment of the motor vehicle and, for the purpose of thermal coupling to the overall cooling circuit, is connected to the HVA circuit.

The HVA circuit has the traction accumulator. For controlling the temperature of the traction accumulator, coolant is carried past the traction accumulator, which coolant, for heating the traction accumulator, transports heat to the traction accumulator and releases said heat to the traction accumulator and, for cooling the traction accumulator, absorbs heat of the traction accumulator and transports said heat away from the traction accumulator. The heating circuit, which is configured for air-conditioning the interior compartment, may have for example a heating device. The heating device may have for example an electric flow heater and/or a heating heat exchanger. Moreover, a heating-circuit pump for conveying the circulating coolant may be arranged in the heating circuit.

The heating circuit is coupled thermally, for example via the refrigeration circuit of the heat system, to the HVA circuit. Particularly preferably, a chiller is connected to the HVA circuit. The chiller is configured for example such that, for cooling the traction accumulator, it transports away the heat released from the traction accumulator. A condenser is preferably connected to the heating circuit, which condenser forms, together with the chiller of the HVA circuit, a heat pump for the purpose of thermally coupling the HVA circuit and the heating circuit. The heat pump is configured such that, in a heat-pump operation mode, it transfers the heat from the HVA circuit into the heating circuit. The chiller or the refrigeration machine is configured in particular for transporting heat into the refrigeration circuit by means of a compressor. The condenser of the heating circuit is connected to the refrigeration circuit, to which the chiller is also connected, and thereby coupled thermally to the chiller. Via the condenser, the heat which is removed from the chiller can be fed into the heating circuit for the purpose of heating the interior compartment.

The cooling circuit has the heat source. The heat source can release heat to the coolant carried past it and, in this way, be simultaneously cooled. Said heat can be transported via the coolant into the HVA circuit, which can be coupled fluidically to the cooling circuit. For this purpose, the cooling circuit has for example a three-way switching valve. In a first switching state of the three-way switching valve, the HVA circuit can be bypassed, and, in a second switching state of the three-way switching valve, the HVA circuit can be incorporated into the cooling circuit.

In the case of a heating requirement of the traction accumulator being present, the coolant transporting the heat is fed into the HVA circuit from the heat source. For this purpose, the second switching state of the three-way switching valve is provided by the control device. However, before the heat is supplied to the traction accumulator, a part of the heat is branched off before it is supplied to the traction accumulator. The coolant that reaches the traction accumulator is colder than the coolant that is fed into the HVA circuit from the heat source. The branched-off heat is fed into the heating circuit in order to preheat the coolant circulating there and to consequently precondition the heating circuit. In particular, the chiller, which is arranged in the heat transfer path between the heat source and the traction accumulator, is supplied with the heat of the heat source via the coolant of the cooling circuit. The control device is configured such that, for branching off the heat, it activates the heat pump, via which the heat is transferred partly to the condenser of the heating circuit. In this case, the preconditioning of the heating circuit is carried out in particular constantly during the heating of the traction accumulator.

The preconditioning of the heating circuit is particularly advantageous if the motor vehicle is at a standstill, for example before the start of a journey, and the heat source for heating the traction accumulator is used at low outside temperatures or ambient temperatures. By way of the transportation of heat into the heating circuit and the associated preheating of the coolant, it is consequently possible, at the start of a journey, for heating of the interior compartment to be provided particularly quickly.

Preferably, the heat source is in the form of a lost heat-releasing device of the electric drive unit of the motor vehicle that can be cooled via the cooling circuit. The lost heat-releasing device may have for example the electric drive machine, the power electronics, a control unit, a charging unit or the like. The lost heat can be released from the device for example in a normal operation mode of the at least one component. In particular, the control device is configured such that, for the purpose of releasing lost power in the form of heat to the coolant of the cooling circuit, it operates the electric drive machine in a lost power-increasing operation mode. The lost heat is therefore deliberately "generated", for example by deliberate operation of the drive machine in an inefficient operation mode. The use of the device also as a heat source is particularly advantageous since, in this way, an additional heater for heating the traction accumulator may be dispensed with.

The invention moreover includes an electrically driveable motor vehicle having a heat system according to the invention. The motor vehicle is in particular a passenger motor vehicle.

The embodiments presented with regard to the heat system according to the invention, and the advantages thereof, apply correspondingly to the heat system according to the invention, to the motor vehicle according to the invention and to the method according to the invention.

Further features of the invention emerge from the claims, the FIGURE and the description of the FIGURE. The features and combinations of features mentioned above in the description and the features and combinations of features mentioned below in the description of the FIGURE and/or shown in the FIGURE alone can be used not only in the in each case stated combination, but also in other combinations or by themselves.

BRIEF DESCRIPTION OF THE DRAWING

FIG. 1 is a schematic illustration of a heat system for an electrically driveable motor vehicle.

DETAILED DESCRIPTION OF THE DRAWING

The disclosure will now be discussed in more detail on the basis of a preferred exemplary embodiment and with reference to the drawing.

The single FIGURE, FIG. 1, shows a schematic illustration of a heat system 1 for an electrically driveable motor vehicle (not shown here). Shown here is an overall cooling circuit of the heat system 1, which overall cooling circuit can be coupled thermally to a refrigeration circuit (not shown here) of the heat system 1. The heat system 1 has a cooling circuit 2, an HVA circuit 3 and a heating circuit 4. The HVA circuit 3 has a traction accumulator 5 of the motor vehicle and has a chiller 6 for cooling the traction accumulator 5. The chiller 6 is connected in particular to the refrigeration circuit (not shown here). The HVA circuit 3 moreover has here an HVA pump 7 for circulating coolant, an HVA shut-off valve 8 upstream of the traction accumulator 5 and an HVA check valve 9 downstream of the traction accumulator 5. The HVA shut-off valve 8 and the HVA check valve 9 fluidically encapsulate the traction accumulator 5.

The heating circuit 4, which is configured for air-conditioning a passenger cell or an interior compartment of the motor vehicle, has a heating device 10 which is configured for heating interior compartment air of the motor vehicle. The heating device 10 has here a heating heat exchanger 11 and an auxiliary heater 12. The heating heat exchanger 11 transports heat of the auxiliary heater 12 into the interior compartment. The heating heat exchanger 11 can moreover transport heat out of the interior compartment for the purpose of cooling the interior compartment. The auxiliary heater 12 may for example be in the form of an electric flow heater (EFH). The heating circuit 4 furthermore has a heating-circuit pump 13, a heating-circuit expansion tank 14 and a coolant-cooled condenser 15. The condenser 15 is, for example via the refrigeration circuit, coupled thermally to the chiller 6 of the HVA circuit 3 and forms, together with the chiller 6, a heat pump 16. In a heat-pump operation mode, the heat pump 16 is configured to transfer heat from the HVA circuit 3 into the heating circuit 4. The heating circuit 4 moreover has a heating-circuit check valve 17.

The cooling circuit 2 has a heat source 18. Here, the heat source 18 is in the form of a lost heat-releasing device 19 of an electric drive unit of the motor vehicle. The lost heat-releasing device 19 may have an electric drive machine 20 and power electronics 21. Moreover, an environment cooling apparatus 22 is connected to the cooling circuit 2, which environment cooling apparatus is also connected to the heating circuit 4 and is configured for exchange of heat with an environment of the motor vehicle.

The cooling circuit 2 and the HVA circuit 3 can be coupled fluidically via an actuating member 23. The actuating member 23 may for example be a three-way switching valve. In this case, in a first switching state of the actuating member 23, the HVA circuit 3 is not connected to the cooling circuit 2 and is bypassed. In a second switching state of the actuating member 23, the HVA circuit 3 is connected to the cooling circuit 2 in that the chiller 6 is incorporated into the cooling circuit 2 and is connected in series between the device 19 and the traction accumulator 5. When the traction accumulator 5 is to be heated, that is to say has a heating requirement, then a control device 24 of the heat system 1 provides the second switching state of the actuating member 23. The coolant thus flows firstly via the lost heat-releasing device 19 and, in the process, absorbs heat. The heat may for example be lost heat that arises in the device 19 in an operation mode which is optimal in terms of loss. Also, it is possible for the lost heat to be deliberately increased in that the control device 24 operates the device 19, in particular the drive machine 20, in a lost power-increasing operation mode. The heat is transported via the actuating member 23 into the HVA circuit 3. Moreover, the control device 24 activates the heat pump 16 such that the chiller 6 branches off a part of the heat transported via the coolant and feeds it into the heating circuit 4 via the condenser 16. The traction accumulator 5 is thus supplied with a coolant which has been slightly cooled via the chiller 6. The fact that a part of the heat has been transferred into the heating circuit 4 means that the coolant in the heating circuit 4 is preheated and the heating circuit 4 is thereby preconditioned.

The preconditioning of the heating circuit at all times during the heating of the traction accumulator 5 consequently allows particularly high comfort for vehicle occupants of the motor vehicle to be provided, since the heating of the interior compartment is sped up.

What is claimed is:

1. A heat system for an electrically driveable motor vehicle, comprising:
   a coolant-carrying HVA circuit coupled to a traction accumulator, wherein the traction accumulator is configured to provide a supply to an electric drive unit of the motor vehicle;
   a coolant-carrying heating circuit configured to control a temperature of a passenger cell of the motor vehicle and which is coupled thermally to the HVA circuit;
   a coolant-carrying cooling circuit coupled to a heat source and coupled fluidically to the HVA circuit, the coolant-carrying cooling circuit configured to transmit, to the traction accumulator, heat provided by the heat source and transported via the coolant to heat the traction accumulator; and
   a control device configured to, during heating of the traction accumulator by the heat provided by the heat source:
   branch off at least a part of the heat provided by the heat source before transmission of the heat to the traction accumulator; and
   transfer said at least a part of the heat into the heating circuit to preheat the coolant in the heating circuit to precondition the heating circuit.

2. The heat system according to claim 1, further comprising:
   a chiller connected to the HVA circuit; and
   a condenser connected to the heating circuit,
   wherein, the chiller of the HVA circuit and the condenser of the heating circuit form a heat pump which is configured such that, in a heat-pump operation mode, the heat pump transfers heat from the HVA circuit into the heating circuit,
   wherein the chiller is arranged in a heat transfer path between the heat source and the traction accumulator, and
   wherein the control device is configured to activate the heat pump during heating of the traction accumulator.

3. The heat system according to claim 1, wherein
the heat source comprises a lost heat-releasing device of the electric drive unit of the motor vehicle configured to be cooled via the cooling circuit.

4. The heat system according to claim 3, wherein
the lost heat-releasing device comprises an electric drive machine, and
wherein the control device is configured to operate the electric drive machine in a lost power-increasing operation mode to release lost power in the form of heat to the coolant of the cooling circuit.

5. A method for operating a heat system comprising:
ascertaining that a heating requirement for a traction accumulator is present;
heating the traction accumulator in response to determining that the heating requirement for the traction accumulator is present;
transmitting only a part of a heat of a heat source to the traction accumulator; and
transmitting another part of the heat of the heat source to a heating circuit before the heat of the heat source reaches the traction accumulator.

6. The method according to claim 5, further comprising:
transferring heat from an HVA circuit into the heating circuit via a heat pump comprising a chiller of the HVA circuit and a condenser of the heating circuit, wherein the chiller is arranged in a heat transfer path between the heat source and the traction accumulator.

7. The method according to claim 5, further comprising:
operating a lost heat-releasing device of an electric drive unit as the heat source.

8. The method according to claim 7, wherein the lost heat-releasing device comprises an electric drive machine, the method further comprising:
operating, by a control device, the electric drive machine in a lost power-increasing operation mode; and
releasing lost power in the form of heat to coolant of the cooling circuit.

* * * * *